Figure 1:
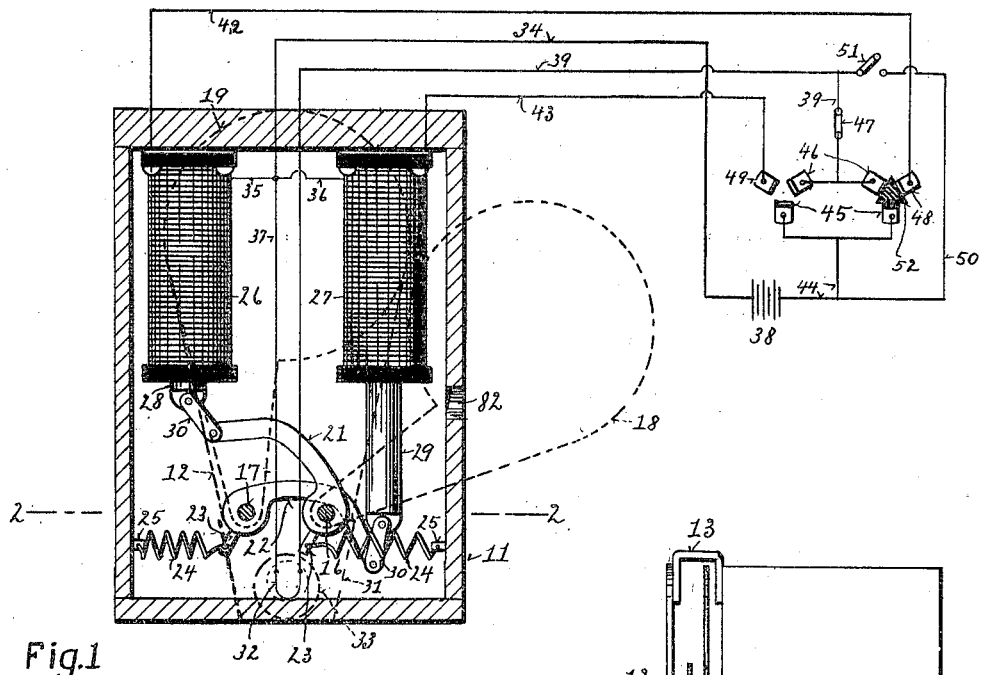

G. W. HACKNEY.
SEMAPHORE SIGNAL FOR AUTOMOBILES.
APPLICATION FILED MAR. 6, 1917.

1,278,916.

Patented Sept. 17, 1918.
2 SHEETS—SHEET 1.

Inventor
George W. Hackney

G. W. HACKNEY.
SEMAPHORE SIGNAL FOR AUTOMOBILES.
APPLICATION FILED MAR. 6, 1917.
1,278,916.
Patented Sept. 17, 1918.
2 SHEETS—SHEET 2.
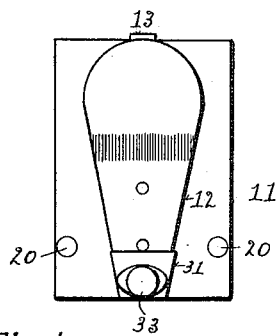
Fig. 6
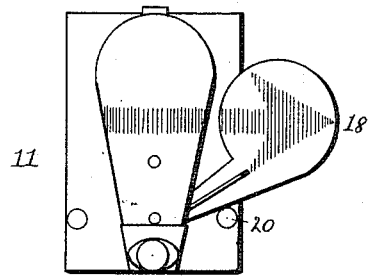
Fig. 7
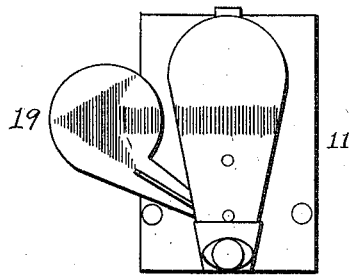
Fig. 8
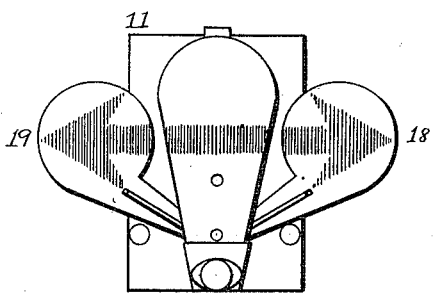
Fig. 9
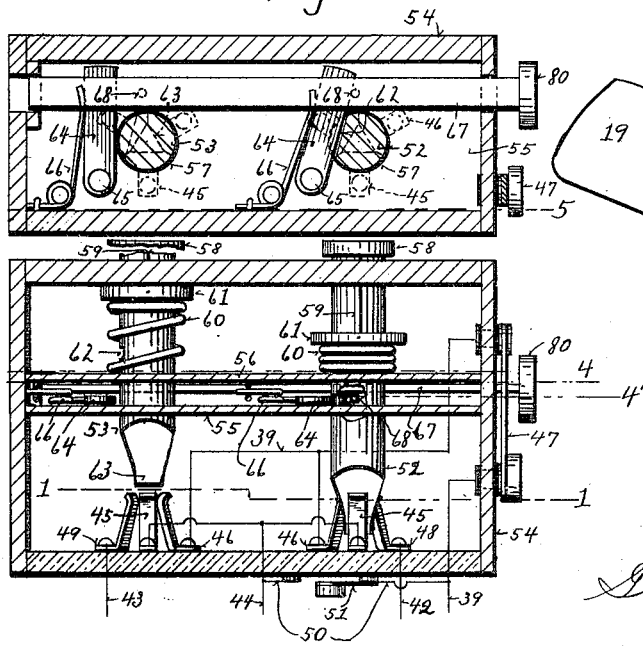
Fig. 4
Fig. 10
Fig. 5
Inventor
George W Hackney
By J. A. Rosen
Atty

UNITED STATES PATENT OFFICE.

GEORGE W. HACKNEY, OF TOPEKA, KANSAS.

SEMAPHORE-SIGNAL FOR AUTOMOBILES.

1,278,916.　　　　Specification of Letters Patent.　　Patented Sept. 17, 1918.

Application filed March 6, 1917. Serial No. 152,471.

*To all whom it may concern:*

Be it known that I, GEORGE W. HACKNEY, a citizen of the United States, residing at Topeka, in the county of Shawnee and State of Kansas, have invented certain new and useful Improvements in Semaphore-Signals for Automobiles, of which the following is a specification.

My invention is an apparatus comprising a frame with two signal arms adapted to be mounted on the rear of an automobile, together with electrical actuating and controlling mechanism for the arms, the controlling mechanism being located most conveniently for the driver of the car, as on the steering post or nearby; the purpose of the invention being to enable the driver to give a mechanical signal visible from the rear when he is about to turn or stop, apt signals being provided for turning to the right, for turning to the left, and for stopping.

It is the object of my invention to improve upon apparatus of this general nature and to produce a cheaply made, compact, strong, durable, easily understood device of this general nature, which is free from complications, and, not being apt to get out of order, reliable.

The invention relates to the arrangement of the two blades, to such arrangement in connection with a novel arrangement of solenoids actuating them, to the controlling means and particularly to the specially designed controlling switch, and to the parts, improvements, and combinations hereinafter set forth and claimed.

In the drawings accompanying and forming part of this specification and in the description of the drawings, I have shown my invention in its preferred form and what I deem to be the best mode of applying the principles thereof; but it is to be understood that, within the scope of the appended claims, I contemplate changes in form, proportions and materials, the transposition of parts, and the substitution of equivalent members, without departing from the spirit of my invention.

Figure 3:
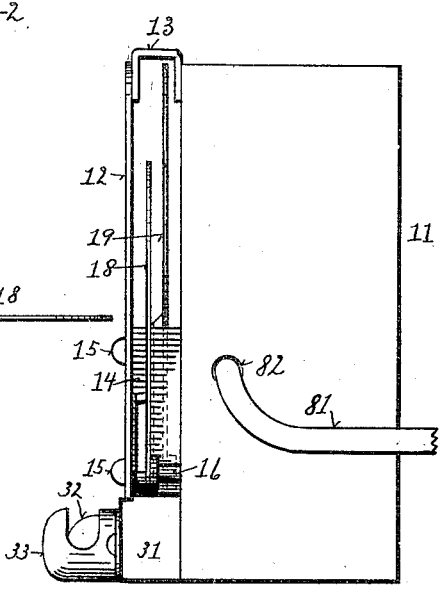
Figure 2:
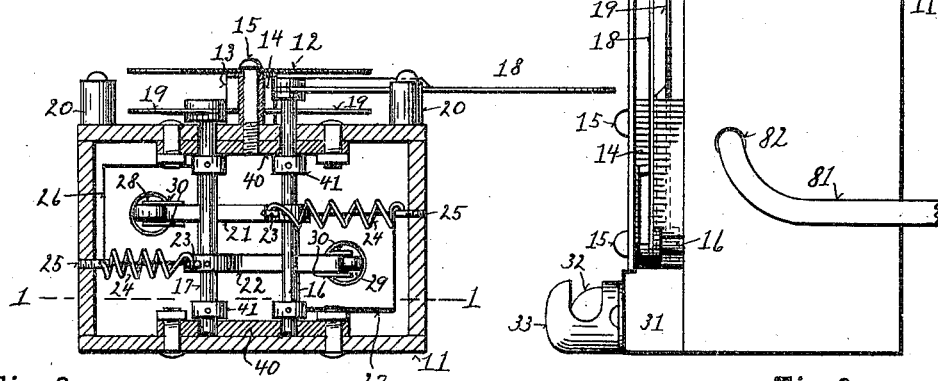

Figure 1 is a vertical sectional elevation, approximately on a plane indicated by the line 1—1 in Fig. 2, of the signaling device proper, together with dotted outlines of the shield, signal arms and lamp, and a diagram of the wiring and switch connections, said switch connections corresponding in part with a plan approximately on the line 1—1 in Fig. 5. Fig. 2 is a bottom plan sectional view approximately on a plane indicated by the line 2—2 in Fig. 1. Fig. 3 is a side elevation of the signaling device proper. Fig. 4 is a sectional plan of the switch device approximately on a plane indicated by the line 4 in Fig. 5, the right-hand switch-tongue, however, being shown in section on the line 4' in Fig. 5. Fig. 5 is a vertical sectional elevation of the same approximately on the line 5 in Fig. 4, certain parts being broken away. Figs. 6, 7, 8 and 9 are face views (that is, views presented to the rear) of the signaling device proper, showing the various positions of the signal arms. Fig. 10 is a face view of a modified form of exterior arrangement.

Similar reference characters indicate similar parts throughout the several views.

The box 11 forms both the supporting frame and the inclosing casing for the parts comprising the signaling device proper, and it is intended to be mounted on the rear of an automobile, preferably on the rear left-hand fender, where it will be clearly visible to persons approaching from the rear. The face fronts, therefore, rearwardly.

12 is a shield spaced apart from the casing and secured thereto by means of a suitable bracket 13 and a spacer 14 and screws 15, 15, the spacer forming a stop for the signal arms as hereinafter explained.

16 and 17 are two shafts mounted horizontally in the frame, substantially parallel to each other, spaced apart from each other, and each projecting rearwardly, that is, out through the face of the casing into the space between the casing and the shield.

Rigidly mounted on the said extended ends of said shafts are arms formed with the signal blades 18 and 19, respectively, preferably of the shape shown, and arranged in offset relation to each other so that they are foldable together, the one blade back of the other and both back of the shield, and being hidden by said shield from view when so folded together. The spacer 14 limits the inward movement of the arms or blades, and the stops or buffers 20, 20 limit their outward or signaling movement.

Rigidly secured to each shaft within the casing is an arm, indicated by the numerals 21 and 22, respectively, and secured to each shaft or arm is a pin 23 to which is secured one end of a spring 24, the other end being secured to a post 25 in the side of the frame;

these springs serving to hold the signal arms in their respective positions back of the shield, and to restore them to that position from their signaling positions. The parts just described are arranged in pairs in offset relation to each other, so they may be compacted closely within the casing; and the operating arms 21 and 22 are curved so that each passes above and down past the far side of the shaft to which it is not attached for the purpose of affording a relatively long swing of the free end in an arc in substantial alinement, as near as may be, with the armatures of the solenoids to which they are attached and by which they are operated.

The two solenoids 26 and 27 are mounted in the frame in parallel relation with each other and offset to correspond with said operating arms 21 and 22, respectively, and their armatures or cores are connected, by means of the links 30, 30, with the ends of the respective operating arms, being thus located on opposite sides of the casing from the shafts to which they are respectively operatively connected through the medium of said links and operating arms.

The purpose of the solenoids is to operate the signal arms in opposition to said springs; that is to say, by passing the current through the left-hand solenoid 26, the right-hand signal arm is extended or swung to the position shown in Figs. 1, 2, 3 and 7, which is a visual signal to one viewing the device from the rear that the car is about to be turned to the right. When the current is broken, the spring restores the signal arm and connected parts to normal position, the signal arm back of the shield. Similarly by passing the current through the right-hand solenoid 27, the left-hand signal arm 19 is extended or swung to signaling position, as shown in Fig. 8, indicating that the car is about to be turned to the left. By passing current through both solenoids at the same time, both signal blades are swung to signaling position, as shown in Figs. 9 and 10, indicating that the car is about to be stopped. When the current is broken, the signal arm or arms are restored to their normal positions back of the shield as indicated in Fig. 6.

An electric lamp 32 is supported on a block 31 at the bottom of the face of the casing, and a reflector 33 throws the light over the area occupied by the shield and signal arms so as to make them clearly visible at night.

Suitable journal bearing plates 40, 40 are provided for the shafts, and collars 41, 41 are provided to prevent endwise movement of the shafts.

The lead wire 34 connects the battery 38 with the solenoids and the lamp through branches 35, 36, and 37, and the battery in turn is connected with the points 45, 45 in each of the two three-point switches (see Figs. 1 and 5) through the lead wire 44. The lamp is also connected, through lead 39 and switch 47 with the two points 46, 46 in each of said three-point switches. The solenoids are connected respectively with the third points 48 and 49 of each of said three-point switches. A shunt circuit 50 around the three-point switches and including a cut-out switch 51, is adapted, when said cut-out switch is closed, to close the lamp circuit through the battery irrespective of the condition of the three-point switches or either of them.

A practical embodiment of the two three-point switches is shown in Figs. 4 and 5. The two switch tongues 52 and 53 are formed at their lower ends into triangular tapered shape, as shown at 63, so as to be adapted to enter into contact with the three correspondingly arranged points or springs, simultaneously, so that each tongue affords electrical connection between each of the three points to which it is applied. The tongues are reciprocatingly mounted in the frame or casing 54 and extend through holes 57 in the partition plates 55 and 56. They are supplied with exterior operating buttons 58, 58 and with splines 59, 59 to prevent them from twisting. A coil compression spring 60 encircles each tongue, bearing between a collar 61 secured thereon and the near partition plate 56, and tends normally to hold the tongue out of contact with the points, as shown by the left-hand tongue in Figs. 4 and 5. The contacts are made by pressing the tongue inwardly as shown by the right-hand tongue in Figs. 1, 4 and 5; and the tongue is latched in this position by the engagement of a latch 64, which is pivoted at 65 and impelled by a spring 66, engaging in a notch 62 formed in the side of the tongue. There is such a latch for each tongue. A bar 67 extends across the frame and is slidably mounted therein adjacent to said latches, and provided with pins 68, 68 to engage said latches, and an operating button 80. The latch is released from the tongue by pushing the bar and button to the left, said bar forming thus a universal release operative on either or both latches.

It is intended that the switch mechanism shall be mounted on the steering shaft or otherwise within easy reach of the driver. The operation is to press either the right-hand or the left-hand button, according to the direction in which he is about to turn the car and to press both buttons if he is about to stop. The signal arm or arms are restored to neutral position behind the shield by pressing the universal release button 80. A spring might be provided for the universal release, but it is believed the springs 66, 66 are ample for restoring the universal release.

It is preferred to color the body of the casing in harmony with the car, but preferably, too, it should be a dark color. And it is preferred to color the shield and arms white, with a red arrowhead on each arm pointing away from the shield, and with a red band across the shield in substantial alinement with the arrowhead to form a stem for the arrow.

The wires may be formed into a cable 81 passing through a hole 82 in the casing. The battery may be suitably located.

The design shown in Fig. 10 is operatively similar to that shown in the other figures. The shield, however, is formed with an opening 70, and on the casing is the word "Stop", visible through said opening when both arms are extended, but covered by either or both of the signal arms when they or either of them is in non-signaling position behind the shield.

With the cut-out switches 47 and 51 in the positions shown in Figs. 1, 4 and 5, it will be understood that normally the lamp is dark and that it is lighted and remains lighted simultaneously with either or both of the signal arms being in signaling position. By opening the switch 47 and leaving switch 51 open, the lamp is entirely out of commission, as is desired in daylight. By closing switch 51 (whether switch 47 be closed or open), the lamp will be lighted continuously. This gives the driver the option of no light, continuous light, and light flashed only with the signals.

Having thus described my invention, what I claim is:

1. The combination of a frame, two spaced, parallel, and horizontally alined shafts mounted therein, a shield secured to and spaced apart from the frame, two arms formed with signal blades, one mounted on each of said shafts and foldable together with the one blade behind the other and both behind said shield and capable of being swung by the respective shafts to the right and left, respectively, of said shield, stops for limiting the movement of said signal arms, springs for holding the signal arms in position behind the shield, operating arms secured to the respective shafts, the arm secured to each shaft extending across the other shaft, solenoids supported in the frame having armatures, links connecting said operating arms with the respective armatures whereby the solenoids actuate the respective signal arms to signaling position in opposition to said springs, an electric lamp positioned on the face of the frame, a reflector for reflecting the rays from the lamp on the area occupied by the shield and blades, a source of current supply for the solenoids and the lamp, and two independent electrical switches and connections for controlling the current and whereby said current is conducted through either solenoid and the lamp and through both solenoids and the lamp.

2. The combination of a frame, two signal arms pivotally mounted therein, a shield secured to the frame, said signal arms being normally hidden behind said shield and being adapted to swing out from behind said shield in opposite directions, two solenoids and suitable connections between the solenoids whereby each arm is operated by a solenoid, a lamp capable of illuminating said shield and arms, two independent three-point switches and a battery, suitable electrical connections connecting one side of the lamp and the two solenoids with one side of the battery and connecting the other side of the battery with one of the points in each of the three-point switches, connecting the other side of the lamp with another of the points in each switch including a cut-out switch, and connecting the other side of each of the solenoids with the third points respectively of said three-point switch, a shunt circuit including a cut-out switch connecting the second-named side of the battery with the said other side of the lamp around said three-point switches and the first-named cut-out switch, said three-point switches being normally open, means for closing said three-point switches, and a universal release for opening said three-point switches.

3. In a device of the kind described, the combination of a frame formed with a shield, signal blades foldable together the one behind the other and both behind the shield, and means for extending the blades out laterally in opposite directions from behind the shield separately and together and for restoring them to folded position; the shield having a horizontal line or arrow stem and each blade having thereon an arrowhead pointing in the direction of movement of said blade away from the shield so that when the blade is fully extended the arrowhead comes into alinement with the stem on the shield forming in effect a long arrow.

GEORGE W. HACKNEY.